United States Patent [19]

Araki et al.

[11] Patent Number: 4,465,531

[45] Date of Patent: Aug. 14, 1984

[54] METHOD OF FORMING A CLOSED LOOP OF A FLEXIBLE STRIP

[75] Inventors: Yusuke Araki, Tachikawa; Tsuginori Oshima, Higashimurayama, both of Japan

[73] Assignee: Bridgestone Tire Company Limited, Tokyo, Japan

[21] Appl. No.: 442,582

[22] Filed: Nov. 18, 1982

[30] Foreign Application Priority Data

Nov. 25, 1981 [JP] Japan ............................... 56-188938

[51] Int. Cl.³ .............................................. B32B 1/10
[52] U.S. Cl. ...................................... 156/64; 156/157; 156/159; 156/217; 156/304.1; 156/304.5
[58] Field of Search ................. 156/64, 137, 157, 217, 156/218, 304.1, 304.5, 159; 428/36

[56] References Cited

U.S. PATENT DOCUMENTS

| | | | |
|---|---|---|---|
| 3,881,983 | 5/1975 | Smith | 156/217 X |
| 4,234,365 | 11/1980 | Shimizu et al. | 156/64 |
| 4,334,946 | 6/1982 | Kanoto | 156/304.1 X |
| 4,421,591 | 12/1983 | DeLigt | 156/304.1 X |

Primary Examiner—Robert A. Dawson

[57] ABSTRACT

A method of forming a closed loop of a flexible strip, comprising conveying an elongated flexible strip in a predetermined longitudinal direction to a predetermined position on a predetermined conveyance plane, detecting the locations and geometry of end portions of the strip while the strip is being conveyed toward the predetermined position thereof, driving two carrier members to move into positions determined with respect to the end portions of the strip in the predetermined position on the conveyance plane on the basis of the detected locations and geometry of the end portions of the strip, transferring the end portions of the strip to the carrier members, respectively, from the conveyance plane, further driving the carrier members to move along paths determined to cause the strip to be gradually deformed into loop form so that the end portions of the strip have respective edges slightly spaced apart in parallel from each other, correcting the positions of the carrier members with respect to each other while the strip is being deformed into the loop form, and joining the end portions of the strip together along the edges thereof after the strip is deformed into the loop form.

7 Claims, 8 Drawing Figures

METHOD OF FORMING A CLOSED LOOP OF A FLEXIBLE STRIP

FIELD OF THE INVENTION

The present invention relates to a method of forming a loop of a flexible strip such as, for example, a steel-cord belt to form part of a pneumatic radial tire and to a loop forming apparatus to put such a method into practice. More particularly, the present invention relates to a method of and an apparatus for forming a loop of a flexible strip initially having bias-edged end portions to be joined together along the respective bias edges of the end portions.

BACKGROUND OF THE INVENTION

Variety of methods are known to form a loop of a flexible strip such as a carcase or breaker ply to form part of a pneumatic tire. One of these methods is to form a loop of a flexible strip by joining together opposite end portions of an initially elongated flexible strip without use of a cylindrical drum. Such a method is disclosed in, for example, Japanese Provisional Patent Publication No. 55-91651.

In the loop forming method taught therein, positioning plates are attached to opposite end portions, respectively, of an elongated flexible strip, whereupon the positioning plates are driven to move until the flexible strip is deformed into loop form and the end portions of the strip are moved into predetermined positions having their respective edges slightly spaced apart in parallel from each other. The end portions of the strip thus deformed are thereafter joined together along the edges thereof. One of the problems encountered in this conventional loop forming method is that the final positions of the end portions of the flexible strip are determined by the movements of the positioning plates. If one of the positioning plates happens to abut to the edge of the end portion of the strip carried on the other positioning plate, the disturbed end portion of the strip is caused to deform irregularly. Another problem is that the end portions of the strip can not be moved into the predetermined positions with satisfactory accuracy due to the errors inevitable in moving the positioning plates into desired positions. Because, furthermore, of the fact that the respective positions of the end portions of the strip are corrected on a conveyor, not only an unduly large force is required for deforming the strip but the end portions of the strip are liable to deform irregularly.

The present invention contemplates elimination of these problems encountered in prior-art loop forming methods.

SUMMARY OF THE INVENTION

In accordance with one outstanding aspect of the present invention, there is provided a method of forming a closed loop of a flexible strip, comprising (1) preparing an elongated flexible strip; (2) conveying the elongated flexible strip in a predetermined longitudinal direction to a predetermined position on a predetermined conveyance plane; (3) detecting the locations and geometry of opposite end portions of the flexible strip while the flexible strip is being conveyed toward the predetermined position thereof; (4) driving two carrier members to move into positions determined with respect to the end portions of the flexible strip in the above mentioned predetermined position on the aforesaid conveyance plane on the basis of the detected locations and geometry of the end portions of the strip; (5) transferring the end portions of the flexible strip to the carrier members, respectively, from the conveyance plane; (6) further driving the carrier members to move along paths determined to cause the flexible strip to be gradually deformed into loop form so that the end portions of the flexible strip have respective edges slightly spaced apart substantially in parallel from each other; (7) correcting the positions of the carrier members with respect to each other while the flexible strip is being deformed into the loop form; and (8) joining the end portions of the strip together along the edges thereof after the flexible strip is deformed into the loop form. The end portions of the flexible strip may have bias edges which are shaped in complementary relationship to each other. In this instance, the locations and geometry of the end portions of the flexible strip include a widthwise middle point and the bias angle of each of the end portions of the flexible strip and are preferably detected optically. The carrier members are preferably driven to move two-dimensionally toward the aforesaid positions or, more specifically may be driven to move vertically and horizontally toward each other and to turn in directions opposite to each other while being driven to move vertically and horziontally. The end portions and preferably a lengthwise middle portion of the flexible strip may be forced away from the conveyance plane when the end portions of the strip are being transferred to the carrier members.

In accordance with another outstanding aspect of the present invention, there is provided a loop forming apparatus for forming a closed loop of a flexible strip having opposite end portions, comprising (a) conveyor means operative to convey an elongated flexible strip in a longitudinal direction on a predetermined conveyance plane; (b) detecting means operative to detect the locations and geometry of the opposite end portions of the flexible strip while the flexible strip is being conveyed toward the predetermined position thereof by the conveyor means; (c) carrier means comprising a pair of carrier members movable into positions determined with respect to the end portions of the flexible strip in a predetermined position on the conveyance plane on the basis of the detected locations and geometry of the end portions of the strip; (d) transfer means for transferring the end portions of the flexible strip to the carrier members, respectively, from the conveyance plane; the carrier members being further movable along paths determined to cause the flexible strip to be gradually deformed into loop form so that the end portions of the flexible strip have respective edges slightly spaced apart substantially in parallel from each other; (e) control means operative to correct the positions of the carrier members with respect to each other while the flexible strip is being deformed into the loop form; and (f) joining means operative to have the end portions of the strip joined together along the edges thereof after the flexible strip is deformed into the loop form. The conveyor means is preferably operative to convey the elongated flexible strip on a substantially horizontal conveyance plane. The above mentioned carrier means may further comprise a pair of horizontal carriage assemblies horizontally movable toward and away from each other along predetermined paths aligned with each other and substantially parallel with the aforesaid longitudinal direction above the horizontal conveyance plane; and a pair of vertical carriage assemblies horizontally movable with the horizontal carriage assemblies, respectively, and vertically movable above and with respect to the horizontal conveyance plane, the vertical carriage assemblies respectively including carrier shafts horizontally extending above the horizontal conveyance plane in directions perpendicular to the above mentioned longitudinal direction and each rotatable about the center axis thereof with respect to each of the horizontal carriage assemblies, and the carrier members being rotatable with the carrier shafts, respectively, about the center axes of the carrier shafts. In this instance, the carrier shafts may be arranged to be axially movable independently of each other and the carrier means may further comprise a pair of sleeves axially fixed with respect to the horizontal conveyance plane and rotatable with respect to the carrier shafts, respectively, about the center axes of the carrier shafts and each having a slanting end face inclined to the center axis of each carrier shaft, and rollers rotatable about axes fixed with respect to the carrier shafts, respectively, and perpendicular to the respective center axes of the carrier shafts, the rollers being rollable on the slanting end faces of the sleeves, respectively. Furthermore, the carrier members may be arranged to be rockable with respect to the carrier shafts about axes fixed with respect to the carrier shafts, respectively. In this instance, the carrier members may be further arranged in such a manner as to be slightly movable with respect to the carrier shafts, respectively, on planes perpendicular to the respective axes of rocking motion of the carrier members.

BRIEF DESCRIPTION OF THE DRAWINGS

The advantages of a loop forming apparatus according to the present invention will be more clearly appreciated from the following description taken in conjunction with the accompanying drawings in which.

DESCRIPTION OF THE PREFERRED EMBODIMENT

Figure 1:
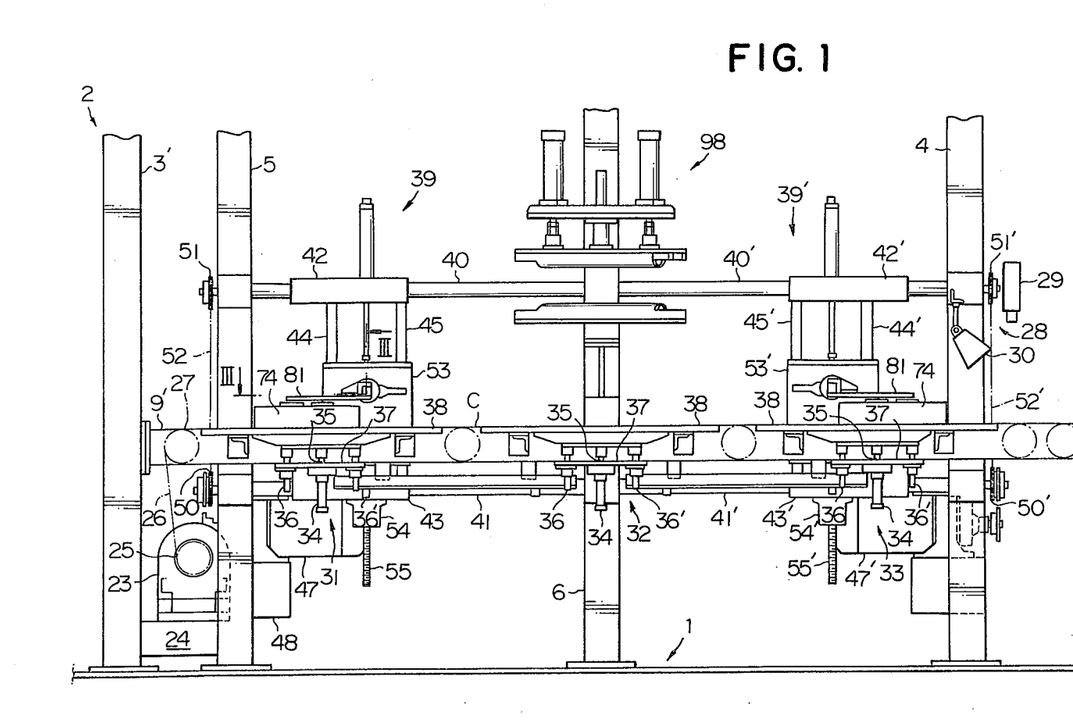
FIG. 1 is a side elevation view showing a preferred embodiment of a loop forming apparatus according to the present invention.
Figure 2:
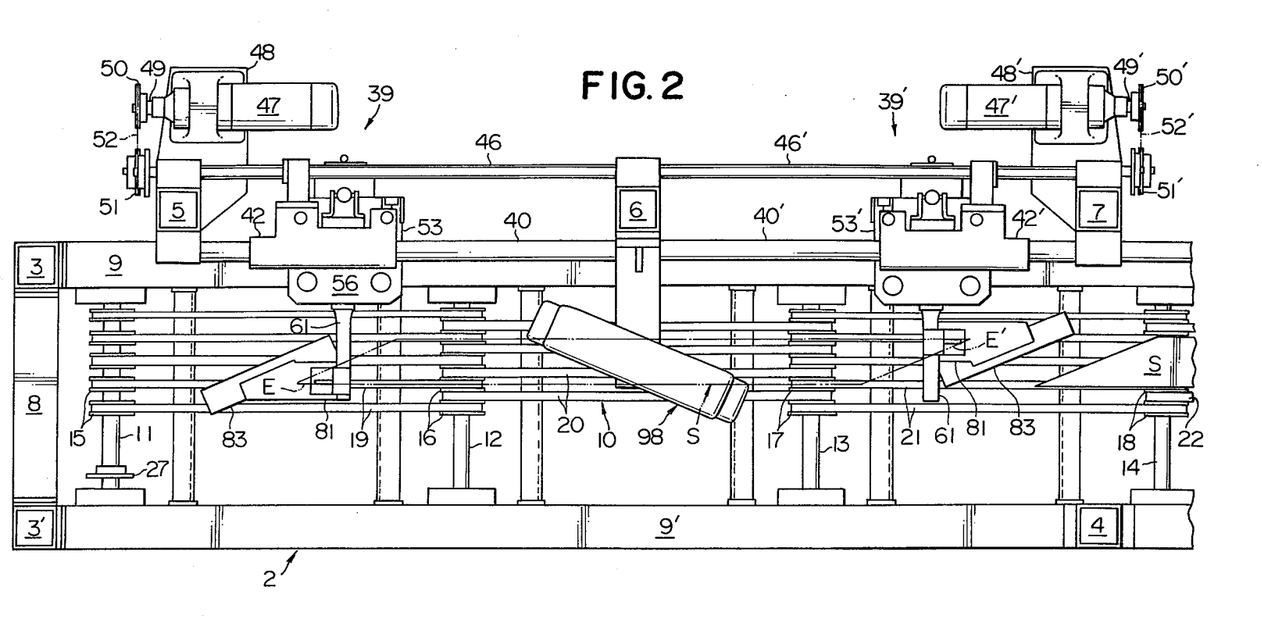
FIG. 2 is a plan view of the loop forming apparatus shown in FIG. 1.

Referring to FIGS. 1 and 2 of the drawings, a loop forming apparatus embodying the present invention is installed on a horizontal floor surface 1 and is adapted to form a loop of a flexible strip from an elongated flexible strip S having bias-edged longitudinal end portions E and E' which are shaped in complementary relationship to each other as indicated by dots-and-dash lines in FIG. 2. The loop forming apparatus comprises a stationary frame structure 2 erected on the floor surface 1 and has a longitudinal direction in which the flexible strip S is to be conveyed into the loop forming apparatus and a lateral direction perpendicular to the longitudinal direction. The frame structure 2 is shown including a pair of front columns 3 and 3', an intermediate column 4, first, second and third side columns 5, 6 and 7, a front upper beam 8, and a pair of upper side beams 9 and 9' as will be better seen from FIG. 2. The front columns 3 and 3' extend vertically on the floor surface 1 and are spaced apart in parallel from each other in a lateral direction of the frame structure 2. The intermediate column 4 also extends vertically on the floor surface 1 and is rearwardly spaced apart in parallel from the front column 3' in a longitudinal direction of the frame structure 2. The first, second and third side columns 5, 6 and 7 are located on one side of the frame structure 2 and are equidistantly spaced apart in parallel from each other also in a longitudinal direction of the frame structure 2. The front upper beam 8 extends between the front columns 3 and 3' in a lateral direction of the frame structure 2 and the upper side beams 9 and 9' extend rearwardly from the front columns 3 and 3' in longitudinal directions of the frame structure 2 as will be seen from FIG. 2. The upper side beam 9 is securely connected at its rear end to a rear column (not shown) while the side beam 9' has an intermediate portion secured to the intermediate column 4 and is also securely connected at its rear end to another rear column (not shown). The first, second and third side columns 5, 6 and 7 are located outside the upper side beam 9.

The loop forming apparatus embodying the present invention further comprises conveyor means to 10 convey the flexible strip S into the loop forming apparatus in a longitudinal direction of the frame structure 2. The conveyor means 10 comprises four pulley shafts 11, 12, 13 and 14 extending between the upper side beams 9 and 9' in lateral directions of the frame structure 2 and are spaced apart in parallel from each other longitudinally of the flexible strip S. The individual pulley shafts 11, 12, 13 and 14 have securely and coaxially carried thereon sets of circumferentially grooved pulleys 15, 16, 17 and 18, respectively. Each of the pulley shafts 11, 12, 13 and 14 has opposite axial end portions respectively journaled in the upper side beams 9 and 9' so that the pulleys carried on each pulley shafts are rotatable about the center axis of the shaft with respect to the flexible strip S. The number of the pulleys on each of the pulley shafts 12, 13 and 14 is twice as large as the number of the pulleys on the foremost pulley shaft 11. A plurality of endless belts 19 are passed between the pulleys 15 on the foremost pulley shaft 11 and alternate ones of the pulleys 16 on the pulley shaft 12 next to the pulley shaft 11 and are arranged in parallel with one another. Likewise, endless belts 20 arranged in parallel with one another are passed between the other ones of the pulleys 16 on the second foremost pulley shaft 12 and alternative ones of the pulleys 17 on the third foremost pulley shaft 13, and endless belts 21 arranged in parallel with one another are passed between the other ones of the pulleys 17 on the third foremost pulley shaft 13 and alternative ones of the pulleys 18 on the fourth foremost pulley shaft 14. The other ones of the pulleys 18 on the fourth foremost pulley shaft 14 in turn have passed thereon endless belts 22 which are further passed on pulleys carried on a rearmost pulley shaft located at the rear end of the flexible strip S, though not shown in the drawings. The endless belts thus passed between each pair of neighboring pulley shafts have upper travelling paths which lie on a common horizontal plane so that the conveyor means as a whole has a horizontal conveyance plane C in a longitudinal direction of the frame structure 2. The conveyor means further comprises a drive motor 23 mounted on a bracket member 24 as shown in FIG. 1. The drive motor has an output shaft carrying a sprocket wheel 25 on which an endless chain 26 is passed. The endless chain 26 is passed between the sprocket wheel 25 anda sprocket wheel 27 securely and coaxially mounted on one of the pulley shafts such as the foremost pulley shaft 11. When the drive motor 23 is in operation, the foremost pulley shaft 11 and accordingly the pulleys 15 thereon are driven for rotation about the center axis of the shaft 11. The rotation of the pulleys 15 on the pulley shaft 11 is transmitted by the endless belts 19 to the pulleys 16 on the second foremost pulley shaft 12 and is carried by the endless belts 20 to the pulley 17 on the third foremost pulley shaft 13 and further by the endless belts 21 to the pulley 18 on the fourth foremost pulley shaft 14. All the endless belts 19, 20, 21 and 22 are thus driven to travel at equal speeds along the above mentioned horizontal conveyance plane C when the drive motor is in operation.

To detect the movement and the geometry of the flexible strip S to be conveyed on the horizontal conveyance plane C by the above described conveyor means, detecting means 28 is provided which comprises a television camera 29 located above the conveyance plane C in the neighborhood of the rear end of the plane C. The television camera 29 is mounted on a suitable bracket member (not shown) secured to the frame structure 2 and is electrically connected to a suitable central control unit (not shown) including, for example, a microcomputer responsive to the image signals delivered from the television camera 28. The central control unit is thus adapted to produce signals representative of various parameters indicative of the locations and geometry of the flexible strip S detected from the image signals supplied from the television camera 28. To illuminate the flexible strip S to be televised on the horizontal conveyance plane C, a light projector 30 is provided which is directed toward a rear end portion of the conveyance plane C.

The loop forming apparatus embodying the present invention further comprises three lifting means 31, 32 and 33 which are arranged in series in a longitudinal direction of the frame structure 2 and which are located in predetermined positions respectively corresponding to a leading end portion E, a lengthwise intermediate portion E' and a trailing end portion E' of a flexible strip S conveyed on the horizontal conveyance plane C into a predetermined position indicated by the dots-and-dash lines in FIG. 2. Each of the lifting means 31, 32 and 33 comprises a vertically extending fluid-operated power cylinder 34 having a cylinder body secured to a suitable support member (not shown) fixedly connected to or forming part of the frame structure 2. The power cylinder 34 has a piston rod 35 projecting upwardly from the cylinder body and securely connected at its leading end to a lifting plate 38 having a horizontal upper face and vertically aligned with the horizontal space between the upper travelling paths of predetermined adjacent two of the endless belts 19, 20 or 21. A pair of guide rods 36 and 36' axially project downwardly from the lifting plate 38 and are horizontally spaced apart in parallel from each other in a longitudinal direction of the frame structure 2. The guide rods 36 and 36' are slidably passed through holes (not shown) formed in a guide plate 37 secured to the frame structure 2. Thus, the lifting plate 38 of the first lifting means 31 is vertically movable through the space between the upper travelling paths of the predetermined adjacent two of the endless belts 19 and, likewise, each of the lifting plates 38 of the second and third lifting means 32 and 33 is vertically movable through the space between the upper travelling paths of the predetermined adjacent two of the endless belts 20 and 21, respectively.

The loop forming apparatus embodying the present invention further comprises front and rear carrier means 39 and 39' which are arranged in series in a longitudinal direction of the frame structure 2. The front carrier means 39 comprises elongated upper and lower guide rods 40 and 41 horizontally extending in a longitudinal direction of the frame structure 2 and each having opposite axial end portions secured to support members which are respectively secured to the previously mentioned first and second side columns 5 and 6. The upper guide rod 40 extends above the horizontal conveyance plane C and the lower guide rod 41 extends below the conveyance plane C as will be seen from FIG. 1. The carrier means 39 further comprises upper and lower horizontal carriage assemblies 42 and 43 movable on and along the upper and lower guide rods 40 and 41, respectively, in longitudinal directions of the frame structure 2 and vertically spaced apart in parallel from each other. The upper and lower horizontal carriage assemblies 42 and 43 are connected together by a pair of guide rods 44 and 45 vertically extending between the horizontal carriage assemblies 42 and 43 and spaced apart in parallel from each other in a longitudinal direction of the frame structure 2. The upper and lower horizontal carriage assemblies 42 and 43 are thus movable together with each other along the upper and lower guide rods 40 and 41, respectively.

An elongated horizontal screw shaft 46 extends in parallel with the upper and lower guide rods 40 and 41 and has opposite axial end portions journaled in bracket members respectively secured to the first and second side columns 5 and 6. One of the horizontal carriage assemblies such as, for example, the upper horizontal carriage assembly 42 is formed with an internally threaded bore (not shown) through which the screw shaft 46 extends. The horizontal screw shaft 46 is rotatable about the center axis thereof with respect to the horizontal carriage assembly 42 so that the carriage assembly 42 is driven to move on and along the screw shaft 46 when the screw shaft 46 is driven for rotation about the center axis thereof. The horizontal screw shaft 46 has an end portion projecting beyond the first column shaft 5. A drive motor 47 is supported on a bracket member 48 secured to the first side column 5 and has an output shaft 49 extending in parallel with the screw shaft 46 as shown in FIG. 2. Sprocket wheels 50 and 51 are securely mounted respectively on the output shaft 49 of the drive motor 47 and the above mentioned end portion of the screw shaft 46 projecting beyond the side column 5. An endless chain 52 is passed between these sprocket wheels 50 and 51 so that, when the drive motor 47 is in operation, the screw shaft 46 is driven for rotation about the center axis thereof through the sprocket wheel 51, endless chain 52 and sprocket wheel 50. The horizontal screw shaft 46, drive motor 47, sprocket wheels 50 and 51 and endless chain 52 thus constitute in combination drive means for driving the carrier means 39 for movement along the upper and lower guide rods 40 and 41 in longitudinal directions of the frame structure 2.

The front carrier means 39 further comprises a vertical carriage assembly 53 supported by and movable along the guide rods 44 and 45 between the horizontal carriage assemblies 42 and 43 and a drive motor 54 supported by, for example, the lower horizontal carriage assembly 43 and having a vertically extending output shaft (not shown). The drive motor 54 has supported thereon a vertical screw shaft 55 with which the output shaft of the motor 54 is held in driving engagement through, for example, a pinion mounted on the motor output shaft, though not shown in the drawings. The vertical screw shaft 55 is rotatable about the center axis thereof and accordingly axially movable with respect to the horizontal carriage assembly 43 and is coupled at its upper end to the vertical carriage assembly 53, which is therefore driven to move vertically between the upper and lower horizontal carriage assemblies 42 and 43 when the drive motor 54 is in operation driving the screw shaft 55 for rotation about the center axis thereof.

The rear carrier means 39' is constructed and arranged similarly to the above described front carrier means 39. The rear carrier means 39' thus comprises upper and lower guide rods 40' and 41' horizontally extending in alignment with the upper and lower guide rods 40 and 41 of the carrier means 39 and each having opposite axial end portions secured to support members which are respectively secured to the second and third side columns 6 and 7. Upper and lower horizontal carriage assemblies 42' and 43' are movable on and along these guide rods 40' and 41', respectively, in longitudinal directions of the frame structure 2 and are connected together by guide rods 44' and 45' extending between the horizontal carriage assemblies 42' and 43'. An elongated horizontal screw shaft 46' extends in alignment with the horizontal screw shaft 46 of the above described front carrier means 39 and has opposite axial end portions journaled in bracket members respectively secured to the second and third side columns 6 and 7. The upper horizontal carriage assembly 42' is formed with an internally threaded bore (not shown) through which the screw shaft 46' extends so that the carriage assembly 42' is driven to move on and along the screw shaft 46' when the screw shaft 46' is driven for rotation about the center axis thereof. A drive motor 47' is supported on a bracket member 48' secured to the third side column 7 and has an output shaft 49'. Sprocket wheels 50' and 51' are mounted respectively on the output shaft 49' of the drive motor 47' and the screw shaft 46' projecting beyond the side column 7. An endless chain 52' is passed between these sprocket wheels 50' and 51' so that the screw shaft 46' is driven for rotation about the center axis thereof when the drive motor 47' is in operation. The horizontal screw shaft 46', drive motor 47', sprocket wheels 50' and 51' and endless chain 52' thus constitute drive means for driving the carrier means 39' for movement along the upper and lower guide rods 40' and 41' in longitudinal directions of the frame structure 2 similarly to their respective counterparts provided for the carrier means 39. The carrier means 39' further comprises a vertical carriage assembly 53' supported by and movable along the guide rods 44' and 45' between the horizontal carriage assemblies 42' and 43' and a drive motor 54' supported by the lower horizontal carriage assembly 43'. The drive motor 54' has supported thereon a vertical screw shaft 55' with which the output shaft of the motor 54 is held in driving engagement through, for example, a pinion mounted on the output shaft of the motor 54'. The vertical screw shaft 54' is rotatable about the center axis thereof and accordingly axially movable with respect to the horizontal carriage assembly 43' and is coupled at its upper end to the vertical carriage assembly 52', which is therefore driven to move vertically between the upper and lower horizontal carriage assemblies 42' and 43' when the drive motor 53' is in operation driving the screw shaft 54' for rotation about the center axis thereof.

Figure 3:
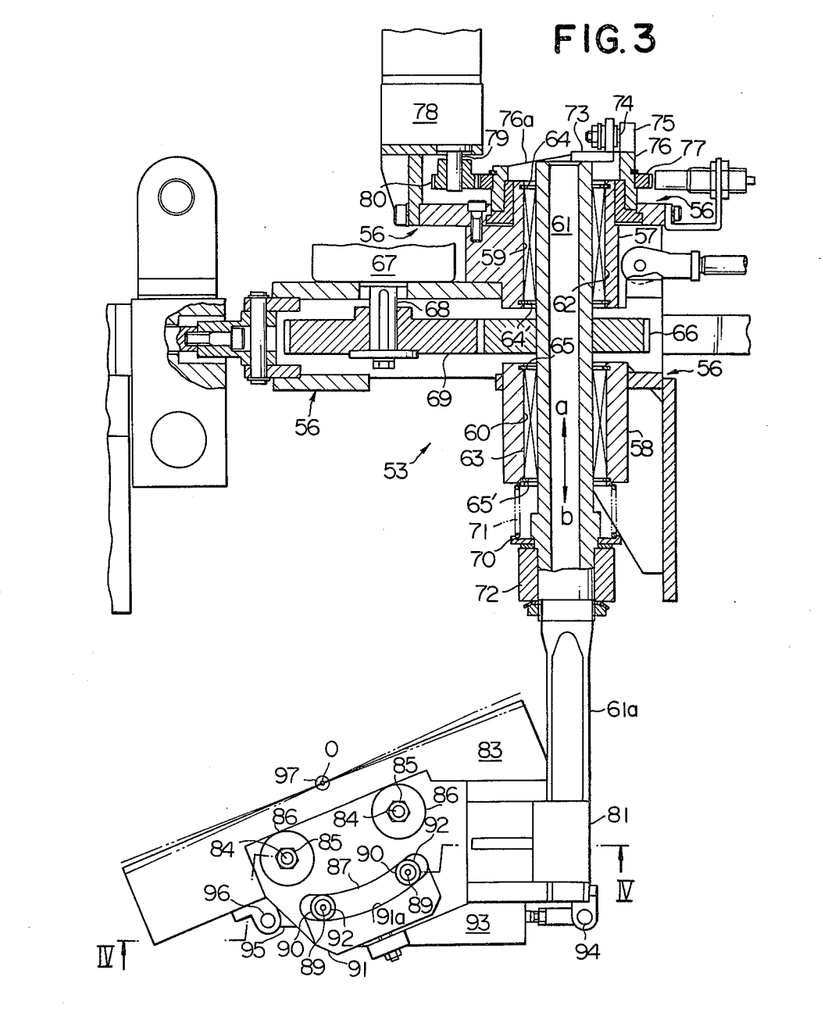
FIG. 3 is a sectional view taken on horizontal planes indicated by lines III—III in FIG. 1.

The vertical carriage assemblies 53 and 53' of the carrier means 39 and 39', respectively, as above described are similar in construction to each other and are for this reason represented by the carriage assembly 53 in FIG. 3. As shown in FIG. 3, the vertical carriage assembly 53 comprises a housing structure 56 including sleeve portions 57 and 58 axially spaced apart from each other and formed with axial bores 59 and 60, respectively, which are axially aligned with each other in a lateral direction of the frame structure 2. A carrier shaft 61 axially extends through these bores 59 and 60 and have axial portions journaled in bearings 62 and 63 which are received in the bores 59 and 60, respectively. The carrier shaft 61 is thus not only rotatable about the center axis but is axially movable with respect to the housing structure 56. The bearings 62 and 63 are axially held in position with respect to the sleeve portions 57 and 58, respectively, by a pair of bearing retaining O-rings 65 and 65' and a pair of bearing retaining O-rings 65 and 65', respectively, as shown. The carrier shaft 61 axially extends in a lateral direction of the frame structure 2 and has an extension 61a above the previously mentioned horizontal conveyance plane C. A gear 66 is securely and coaxially mounted on the carrier shaft 61 and is located between the sleeve portions 57 and 58 of the housing structure 56. A pulse motor 67 is mounted on the housing structure 56 and has an output shaft 68 axially extending in parallel with the carrier shaft 61. The output shaft 68 of the pulse motor 67 has securely and coaxially mounted thereon a gear 69 which is housed within the housing structure 56 and which is held in mesh with the gear 66 on the carrier shaft 61. The carrier shaft 61 is thus driven for rotation about the center axis thereof with respect to the housing structure 56 when the pulse motor 67 is in operation. The carrier shaft 61 thus arranged is urged to axially protrude outwardly from the housing structure 56 by suitable biasing means. In the shown embodiment of the apparatus according to the present invention, the biasing means comprises an annular spring seat element 70 secured to the carrier shaft 61 and axially spaced apart from the outer end face of the sleeve portion 58 of the housing structure 56, and a helical compression spring 71 enclosing an axial portion of the shaft 61 and seated at one end thereof on the outer end face of the sleeve portion 58 and at the other end thereof on the above mentioned spring seat element 70 as shown. The biasing means further comprises a collar 72 secured to the carrier shaft 61 and engaging the spring seat element 70 so as to hold the spring seat element 70 in axial position on the shaft 61.

The carrier shaft 61 has securely attached to its end face opposite to the axial extension 61a of the shaft 61 a bracket member 73 on which a shaft 74 carrying a roller 75 is mounted. The roller shaft 74 axially extends in a direction perpendicular to the center axis of the carrier shaft 61 and the roller 75 is rotatable about the center axis of the shaft 74. The housing structure 56 has further mounted thereon a cylindrical sleeve 76 which is located adjacent the bracket member 73 and which is rotatable about the center axis of the carrier shaft 61.

The sleeve 76 has a slanting end face 76a inclined with respect to the axis of rotation of the carrier shaft 61 and the roller 75 is held in rollable engagement with this inclined end face 76a. The sleeve 76 has securely and coaxially mounted on its outer peripheral surface a ring-shaped gear 77. A pulse motor 78 is mounted on the housing structure 56 and has an output shaft 79 axially extending in parallel with the carrier shaft 61. The output shaft 79 of the pulse motor 78 has securely and coaxially mounted thereon a gear 80 which is held in mesh with the gear 77 on the sleeve 76. The sleeve 76 is thus driven for rotation about the center axis of the carrier shaft 61 when the pulse motor 78 is in operation.

Figure 4:
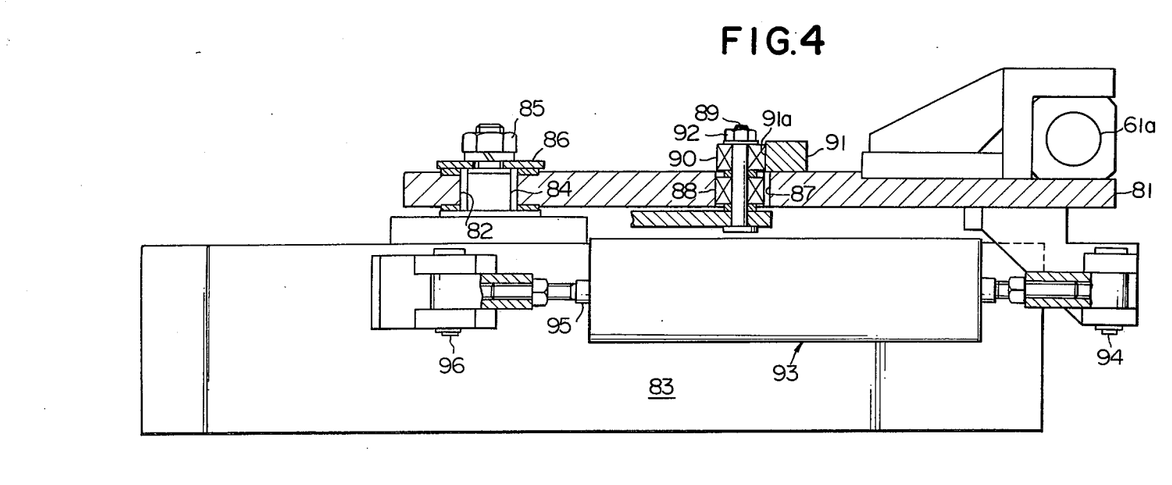
FIG. 4 is a sectional view taken on vertical planes indicated by IV—IV in FIG. 3.

As shown in FIGS. 3 and 4, the carrier shaft 61 has securely carried on its axial extension 61a a bracket member 81 extending perpendicularly to the center axis of the shaft 61. The bracket member 81 is formed with a pair of apertures 82 (only one of which is seen in FIG. 4) having circular cross sections and spaced apart a predetermined distance from each other. Below the bracket member 81 is provided an elongated carrier member 83 which is supported by the bracket member by means of bolts 84 projecting upwardly from the carrier member 83 and axially passed through the apertures 82, respectively, in the bracket member 81 as shown in FIG. 4. Each of the bolts 84 is smaller in diameter than each of the apertures 82 and is retained to the bracket member 81 by means of a nut 85 with a circular plate 86 clamped between the nut 85 and the upper surface of the bracket member 81. The bolts 84 being smaller in diameter than the apertures 82, the carrier member 83 is slightly movable with respect to the bracket member 81 in directions perpendicular to the center axes of the bolts 84. The bracket member 81 is further formed with an arcuate slot 87 extending arcuately about a predetermined axis O which is preferably located on a plane perpendicular to the direction of elongation of the carrier member 83 and bisecting the length of the carrier member 83 as will be seen from FIG. 3. A first pair of guide rollers 88 are received in this arcuate slot 87 and are rotatably mounted on roller shafts 89, respectively, axially projecting from the carrier member 83 and parallel with the above described bolts 84. The roller shafts 89 axially project upwardly from the bracket member 81 and have further coaxially carried thereon a second pair of guide rollers 90 which are rotatable on the shafts 89, respectively, and which axially spaced apart from the first pair of guide rollers 88, respectively. The second pair of guide rollers 90 are located above the bracket member 81 and are rollably received on an arcuately curved cam surface 91a of a guide member 91 securely attached to the upper face of the bracket member 81. The guide rollers 90 are retained to the roller shafts 89 by means of nuts 92 and, respectively, as shown. The cam surface 91a of the guide member 91 is arcuately curved about the above mentioned predetermined axis O of the carrier member 83, which is accordingly rockable about the particular axis O with respect to the bracket member 81. To drive the carrier member 83 for rocking motion about the axis O, drive means is provided which in the shown embodiment comprises a fluid-operated power cylinder 93 having a cylinder body pivotally connected to the bracket member 81 by means of a pivot pin 94 and a piston rod 95 pivotally connected at its leading end to the carrier member 83 by means of a pivot pin 96 having a center axis parallel with the axis of rocking motion O of the carrier member 83. The power cylinder 93 thus connected between the bracket member 81 and the carrier member 83 is of the type which is capable of causing the piston rod 94 to longitudinally move minutely stepwise with respect to the cylinder body and accordingly to the bracket member 81. The carrier member 83 has a permanent magnet or an electromagnetic attached thereto or incorporated therein though not shown in the drawings and has fixedly carried thereon a light emitter-receiver unit 97 which is located in alignment with the axis of rocking motion O of the carrier member 83 as schematically shown in FIG. 3. The light emitter-receiver unit 97 is adapted to project a beam of light downwardly toward a mirror (not shown) fixedly located below the carrier member 83 and to receive the beam of light reflected from the mirror. The vertical carriage assembly 53' of the rear carrier means 39' is constructed and arranged similarly to the carriage assembly 53 of the front carrier means 39 and, thus, the carrier member 83 of the carriage assembly 53' is also rockable about a predetermined axis O' not shown in FIG. 2.

The loop forming apparatus embodying the present invention further comprises a joining assembly 98 which is positioned above the intermediate lifting means 32 and which is supported by suitable support members secured to the second side column 6 of the frame structure 2. The joining assembly 98 is operative to join together the end portions E and E' of the flexible strip S conveyed into the previously mentioned predetermined position on the horizontal conveyance plane C as indicated by the dots-and-dash lines in FIG. 2.

The respective power cylinders 34 of the lifting means 31, 32 and 33 and the respective power cylinders 93 of the carrier means 39 and 39' communicate with a suitable source of fluid under pressure through solenoid-operated valves, though not shown in the drawings. The drive motors 23, 47, 47', 54 and 54' (FIGS. 1 and 2) and the pulse motors 67 and 78 of the carrier means 39 and 39' and the above mentioned solenoid-operated valves for the power cylinders 34 and 93 are electrically connected to the previously mentioned central control means.

Description will be hereinafter described regarding the operation of the loop forming apparatus constructed and arranged in accordance with the present invention as hereinbefore described.

At an incipient stage of each cycle of operation of the apparatus, an elongated strip such as, for example, a steel-cord belt to produce a pneumatic tire is unwound and fed from a rotating drum (not shown) and is cut into the form of a flexible strip S having a predetermined length and bias-edged leading and trailing end portions E and E'. The flexible strip S thus produced is transferred to the conveyor means 10 having the endless belts 19, 20, 21 and 22 being continuously driven to travel by the drive motor 23 through the pulley 25, endless chain 26 and pulley 27. The flexible strip S carried on the endless belts 19, 20, 21 and 22 is conveyed on the horizontal conveyance plane C in a longitudinal direction of the frame structure 2 toward the predetermined position indicated by the dots-and-dash lines in FIG. 2. While the flexible strip S is being thus conveyed on the conveyance plane C, the upper and lower horizontal carriage assemblies 42 and 43 and the vertical carriage assembly 53 of the front carrier means 39 are held in positions having the carrier member 83 located above and ahead of the leading end portion E of the strip S on the conveyance plane C and the upper and lower horizontal carriage assemblies 42' and 43' and the vertical carriage assembly 53' of the rear carrier means 39' are held in the positions having the carrier member 83 located above and at the rear of the trailing end portion E' of the strip S as will be seen from FIG. 2. The lifting plates 38 of the lifting means 31, 32 and 33 are held in positions below the horizontal conveyance plane C.

Figure 5:
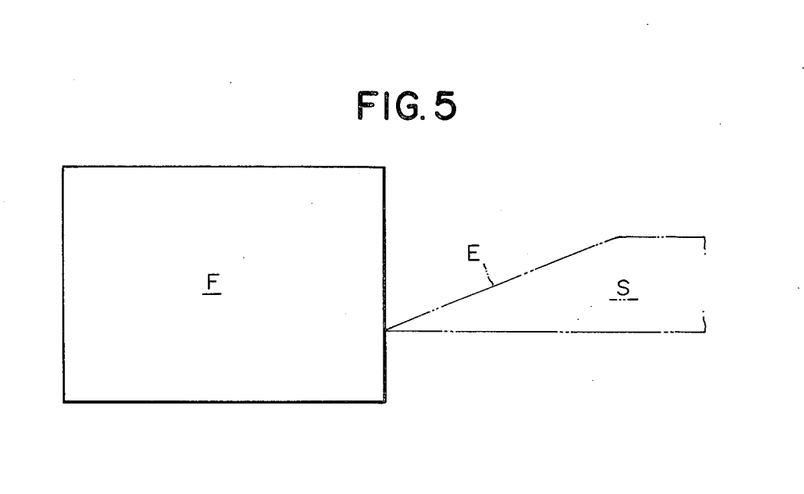
FIGS. 5 to 8 are schematic views showing the images of end portions of an elongated flexible strip as detected by a television camera while the flexible strip is being conveyed toward a predetermined position to be treated by the loop forming apparatus embodying the present invention.
Figure 6:
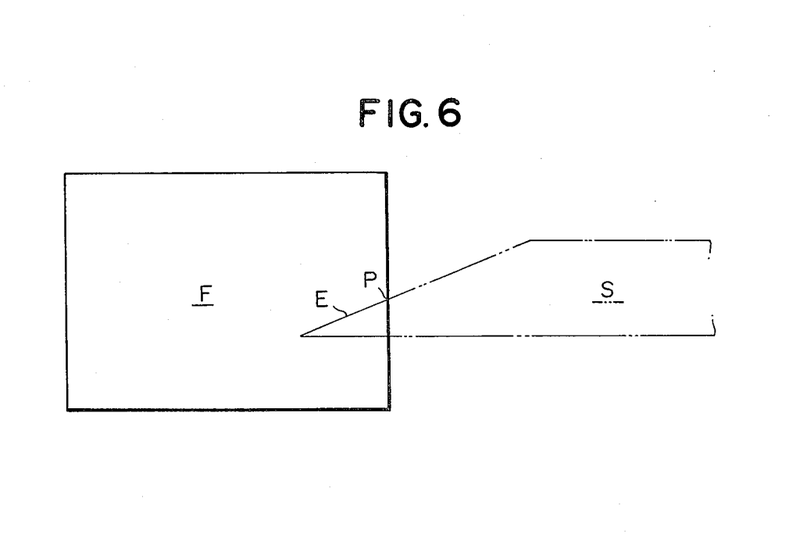
Figure 7:
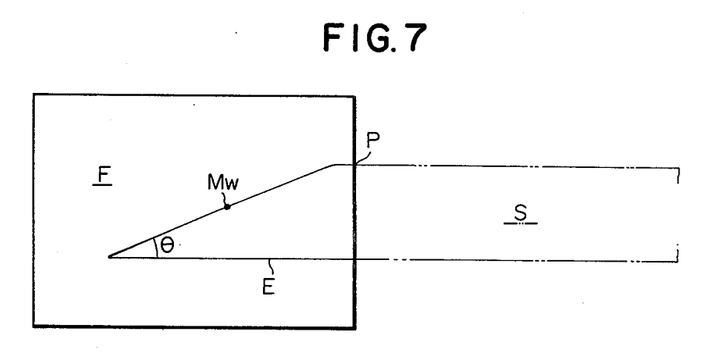
Figure 8:
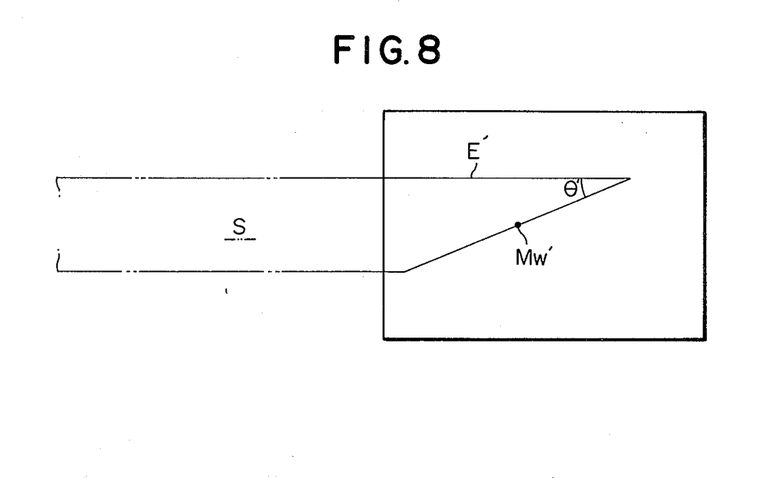

As the flexible strip S advances forwardly on the horizontal conveyance plane C, the flexible strip S enters the field of vision F of the television camera 29 as shown in FIG. 5 so that the camera 29 detects the pointed end of the bias-edged leading end portion E of the strip S. As the flexible strip S further advances on the conveyance plane C, the television camera 29 detects the location of the point P (FIG. 6) at which the bias edge of the leading end portion E of the strip S is intersected by the vertical line defining a horizontal end of the field of vision F of the television camera 29. A signal indicative of the detected location of the point P is produced by the television camera 29 and is fed to the central control unit, which thus determines the location and geometry of the televised leading end portion E of the strip S on the basis of the signal and various pieces of information stored in the central control unit. If the location and geometry of the leading end portion E of the strip S thus determined is found to be unacceptable, the central control unit produces a warning signal to enable the operator to interrupt the conveyance of the particular strip S and to remove the strip S from the conveyor means 10. After the flexible strip S is moved past a longitudinal position in which the bias-edged leading end portion E thereof wholly falls within the field of vision F of the television camera 29 as shown in FIG. 7, the point P at which the vertical line defining the horizontal end of the field of vision F intersects the detected edge of the strip S remains fixed. The widthwise middle point Mw of the leading end portion E of the strip S can thus be determined in the central control unit by, for example, determining the point intersecting the length of the bias edge of the end portion E while the bias angle $\theta$ of the end portion E can be determined from, for example, the relationship between the length and the maximum width of the end portion E. When the flexible strip S reaches a position in which the bias-edged trailing end portion E' thereof wholly falls within the field of vision F of the television camera 29 as shown in FIG. 8, the widthwise middle point Mw' of the trailing end portion E' of the strip S is determined in the central control unit by, for example, determining the point intersecting the length of the bias edge of the end portion E' and the bias angle $\theta'$ of the end portion E' is determined from, for example, the relationship between the length and the maximum width of the end portion E'.

When the flexible strip S thus conveyed forwardly on the horizontal conveyance plane C reaches a predetermined longitudinal position having its lengthwise middle portion located below the joining assembly 98 as indicated by the dots-and-dash lines in FIG. 2, the drive motor 23 is switched off and as a consequence the conveyor means 10 is brought to a stop. Control signals are then supplied from the central control unit so as to correct the positions of the respective carrier members 83 of the vertical carriage assemblies 53 and 53' with respect to the flexible strip S thus positioned on the conveyance plane C. In response to these control signals, a certain number of pulses representative of the distance between the location of each of the axes of rocking motion O and O' of the carrier members 83 of the carriage assemblies 53 and 53' and each of the detected points Mw and Mw' of the end portions E and E' of the strip S are fed to the pulse motor 78 (FIG. 3) of each of the carriage assemblies 53 and 53' so that the pulse motor 78 is actuated to drive its output shaft 79 for rotation about the center axis thereof. The rotation of the motor output shaft 79 is transmitted through the gears 80 and 77 to the sleeve 76, which is therefore driven for rotation about the center axis of the carrier shaft 61. The rotation of the sleeve 76 causes the roller 75 to roll on the slanting end face 76a of the sleeve 76 so that the carrier shaft 61 is forced to axially move in a direction indicated by arrow a against the force of the compression spring 71 or allowed to axially move in a direction indicated by arrow b by the force of the spring 71 over a distance dictated by the number of the pulses supplied to the pulse motor 78. As the respective carrier shafts 61 of the carriage assemblies 53 and 53' are thus moved axially, the bracket members 81 respectively secured to the axial extension 61a of the carrier shafts 61 and accordingly the carrier members 83 coupled to the bracket members 81 by means of the bolts 84 (FIGS. 3 and 4) are caused to move with respect to the leading and trailing end portions E and E' of the flexible strip S in lateral directions of the frame structure 2 until the axes of rocking motion O and O' of the carrier members 83 of the carriage assemblies 53 and 53' are correctly aligned with the widthwise middle points Mw and Mw' of the end portions E and E' of the strip S. The control signals produced in the central control unit are also fed to the solenoid-operated valve intervening between the power cylinder 93 on the bracket member 81 of each of the carriage assemblies 53 and 53' and the source of fluid under pressure and cause the valve to actuate the power cylinder 93 to drive its piston rod 95 to axially move in either direction with respect to the bracket member 81. The carrier members 83 of the carriage assemblies 53 and 53' are thus caused to turn about the axes of rocking motion O and O' with respect to and above the leading and trailing end portions E and E', respectively, of the flexible strip S with the guide rollers 88 (FIG. 4) rolling in the arcuate slots 87 in the bracket members 81 and the guide rollers 90 rolling on the arcuately curved cam surfaces 91a of the guide members 91, respectively. The carrier members 83 are in this manner caused to rock about the axes O and O' as indicated by dots-and-dash lines in FIG. 3 until the carrier member 83 longitudinally extends in parallel with the bias edge of each of the leading and trailing end portions E and E' of the strip S, viz., at the angle of $\theta$ to the direction in which the flexible strip S longitudinally extends on the conveyance plane C.

Control signals are then fed to the drive motors 47 and 47' (FIG. 2) for the horizontal carriage assemblies 42 and 42', respectively, and cause the motors 47 and 47' to drive the output shafts 49 and 49' for rotation. The rotation of the motor output shafts 49 and 49' is transmitted through the sprocket wheels 50 and 50', endless chains 52 and 52' and the sprocket wheels 51 and 51' to the screw shafts 46 and 46', respectively, and thus drives the shafts 46 and 46' for rotation about the respective center axes thereof. It follows that the horizontal carriage assemblies 42 and 42' are driven to move toward each other on and along the screw shafts 46 and 46', respectively. As the horizontal carriage assemblies 42 and 42' are thus moved along the screw shafts 46 and 46', respectively, the vertical carriage assembly 53 on the guide rods 44 and 45 connected to the horizontal carriage assembly 42 and the vertical carriage assembly 53' on the guide rods 44' and 45' connected to the horizontal carriage assembly 42' are also moved above and in parallel with the flexible strip S on the conveyance plane C so that the beams of light emitted downwardly from the respective light emitter-receiver units 97 on the carrier members 83 and reflected upwardly from the mirrors respectively underlying the carrier members 83 horizontally move with respect to the leading and trailing end portions E and E' of the strip S. When the beams of light thus emitted from and reflected toward the light emitter-receiver units 97 are intercepted by the bias edges of the leading and trailing end portions E and E' of the strip S, signals are produced by the light emitter-receiver units 97 and are fed to the central control unit, which supplies control signals to the drive motors 47 and 47' and cause the motors 47 and 47' to stop at a predetermined timing after the signals are delivered from the light emitter-receiver units 97 to the central control unit. The carrier members 83 of the vertical carriage assemblies 53 and 53' are as a consequence held in positions slightly closer to a lengthwise middle portion of the flexible strip S from the leading and trailing end portions E and E', respectively, of the strip S.

Control signals are thereupon supplied from the central control unit to the drive motors 54 and 54' for the vertical carriage assemblies 53 and 53', respectively, and cause the motors 54 and 54' to drive the screw shafts 55 and 55' for rotation about the respective center axes thereof. It follows that the vertical carriage assemblies 53 and 53' are driven to move downwardly on and along the screw shafts 55 and 55', respectively, until the carrier members 83 of the carriage assemblies 53 and 53' are brought into contact with upper surfaces of the leading and trailing end portions E and E', respectively, of the flexible strip S on the horizontal conveyance plane C. The end portions E and E' of the flexible strip S including cords of steel are thus caused to stick to the lower faces of the carrier members 83 of the carriage assemblies 53 and 53', respectively, by the permanent magnets or electromagnets attached to or incorporated in the carrier members 83. Control signals are then supplied to the drive motors 47 and 47' for the horizontal carriage assemblies 42 and 42', and the drive motors 54 and 54' for the vertical carriage assemblies 53 and 53'. The drive motors 47 and 47' being thus actuated, the screw shafts 40 and 40' are further driven for rotation about the respective center axes thereof and cause the horizontal carriage assemblies 42 and 42' to move toward each other on and along the screw shafts 40 and 40', respectively, so that the vertical carriage assemblies 53 and 53' are also caused to move toward each other in a longitudinal direction of the frame structure 2. The drive motors 54 and 54' being actuated, furthermore, the vertical carriage assemblies 53 and 53' are driven to move upwardly on and along the guide rods 44 and 45 and the guide rods 45' and 46', respectively, while being moved toward each other in the longitudinal direction of the frame structure 2. The carrier member 83 of the vertical carriage assembly 53 is thus caused to move upwardly and rearwardly with respect to the frame structure 2 and, likewise, the carrier member 83 of the vertical carriage assembly 53' is caused to move upwardly and forwardly with respect to the frame structure 2. As a consequence of such horizontal and vertical movements of the carrier members 83 of the vertical carriage assemblies 53 and 53', the leading and trailing end portions E and E' of the flexible strip S on the horizontal conveyance plane C are caused to move and warp each in an arc toward each other over the horizontal conveyance plane C. While the end portions E and E' of the strip S are being thus raised over the horizontal conveyance plane C, control signals are supplied to the solenoid-operated valves each intervening between each of the lifting means 31, 32 and 33 and the source of the pressurized fluid and actuate the power respective cylinders 34 of the lifting means 31, 32 and 33 to drive their respective piston rods 35 to move upwardly with respect to the frame structure 2. The lifting plates 38 of the individual lifting means 31, 32 and 33 are, accordingly, driven to move upwardly beyond the horizontal conveyance plane C and force the leading end portion E, a lengthwise middle portion and the trailing end portion E' of the flexible strip S upwardly above the endless belts 19, 20 and 21, respectively, thereby aiding in the upward movement of the leading and trailing end portions E and E' of the strip S.

While the vertical carriage assemblies 53 and 53' are being driven to move as above described, control signals are supplied to the pulse motors 67 (FIG. 3) respectively associated with the carrier shafts 61 of the vertical carriage assemblies 53 and 53' and actuate the pulse motors 67 to drive their respective output shafts 68 for rotation about the center axes thereof. The rotation of the output shaft 68 of each of the pulse motors 67 is transmitted through the gears 69 and 66 to the carrier shaft 61 of each of the vertical carriage assemblies 53 and 53' and drives the carrier shaft 61 for rotation about the center axis. In this instance, the carrier shafts 61 of the carriage assemblies 53 and 53' are driven to turn in opposite directions to each other about the respective center axes of the shafts 61. The rotation of the carrier shafts 61 of the carriage assemblies 53 and 53' is accompanied by angular movements of the carrier members 83 and accordingly the end portions E and E' of the strip S about the center axes of the shafts 61. As a result of the upward, horizontal and angular movements of the leading and trailing end portions E and E' of the flexible strip S, the strip S as a whole is caused to deform into annular form above the horizontal conveyance plane C and below the joining assembly 98. As the carrier shaft 61 is driven to turn about the center axis thereof as above discussed, the roller 75 on the bracket member 73 secured to the shaft 61 is caused to roll on the slanting end face 76a of the sleeve 76. To cancel the angular displacement between the carrier shaft 61 and the sleeve 76, a train of control pulses are supplied from the central control means to the pulse motor 78 and actuate the motor 78 to drive the output shaft 79 for rotation in a direction and through an angle to enable the sleeve 76 to turn about the center axis of the carrier shaft 61 in synchronism with the rotation of the shaft 61. The angular displacement between the carrier shaft 61 and the sleeve 76 is cancelled in this manner and accordingly the carrier shaft 61 is prevented from being axially moved with respect to the flexible strip S being annularly deformed.

When the carrier shafts 61 of the vertical carriage assemblies 53 and 53' make full turns about the respective center axes thereof, the carrier members 83 of the carrier shaft 61 are turned upside down and have the end portions E and E' of the flexible strip S attached to their respective upper faces. If, under these conditions, the end portions E and E' of the flexible strip S have their respective bias edges slightly spaced apart in parallel from each other on the upper faces of the carrier members 83, each of the drive motors 47, 47', 54 and 54' and the respective pulse motors 67 of the vertical carriage assemblies 53 and 53' is brought to a stop. If the carrier members 83 are found to have failed to hold the end portions E and E' of the flexible strip S in such positions with respect to each other, a train of control pulses are fed to the pulse motors 78 of the carriage assemblies 53 and 53' so as to drive the respectively associated sleeves 76 for rotation about the center axes of the carrier shafts 61. The carrier shafts 61 are accordingly driven to axially move each in the direction of the arrow a or b (FIG. 3) with respect to the frame structure 2 so that the respective bias edges of the end portions E and E' of the strip S are slightly spaced apart in parallel from each other. If necessary, control signals are also fed to the solenoid-operated valves associated with the respective power cylinders 93 of the carriage assemblies 53 and 53' so that the power cylinders 93 are actuated to drive the respectively associated carrier members 83 to turn about the axes of rocking motion O and O' thereof with respect to the frame structure 2 so that the end portions E and E' of the strip S which are respectively carried on the carrier members 83 are enabled to correct positions with respect to each other. After the carrier members 83 of the carriage assemblies 53 and 53' are finally moved to the positions respectively holding the end portions E and E' of the strip S in such correct positions with respect to each other, the joining assembly 98 is actuated by a control signal from the central control unit so that the bias-edged end portions E and E' of the strip S are joined together along the respective bias edges of the end portions E and E' and, as a consequence, the strip S is rendered into closed loop form.

What is claimed is:

1. A method of forming a closed loop of a flexible strip, comprising
   (1) preparing an elongated flexible strip;
   (2) conveying the elongated flexible strip in a predetermined longitudinal direction to a predetermined position on a predetermined conveyance plane;
   (3) detecting the locations and geometry of opposite end portions of the flexible strip while the flexible strip is being conveyed toward said predetermined position thereof;
   (4) driving two carrier members to move into positions determined with respect to the end portions of the flexible strip in said predetermined position on said conveyance plane on the basis of the detected locations and geometry of said end portions;
   (5) transferring the end portions of the flexible strip to said carrier members, respectively, from said conveyance plane;
   (6) further driving the carrier members to move along paths determined to cause the flexible strip to be gradually deformed into loop form so that the end portions of the flexible strip have respective edges slightly spaced apart substantially in parallel from each other;
   (7) correcting the positions of the carrier members with respect to each other while the flexible strip is being deformed into said loop form; and
   (8) joining the end portions of the strip together along said edges thereof after the flexible strip is deformed into said loop form.

2. A method as set forth in claim 1, in which said end portions of the flexible strip have bias edges which are shaped in complementary relationship to each other, wherein said locations and geometry include a widthwise middle point and the bias angle of each of the end portions of the flexible strip.

3. A method as set forth in claim 1 or 2, in which said carrier members are driven to move two-dimensionally toward said positions.

4. A method as set forth in claim 1 or 2, in which said conveyance plane is substantially horizontal and in which said carrier members are driven to move vertically and horizontally toward each other and to turn in directions opposite to each other while being driven to move vertically and horizontally.

5. A method as set forth in claim 1 or 2, further comprising forcing the end portions of the flexible strip away from said conveyance plane when the end portions are being transferred to said carrier members.

6. A method as set forth in claim 5, further comprising forcing not only the end portions but also a lengthwise middle portion of the flexible strip away from said conveyance plane when the end portions are being transferred to said carrier members.

7. A method as set forth in claim 1 or 2, in which said locations and geometry of the end portions of the flexible strip are detected optically.

* * * * *